(12) United States Patent
Børseth et al.

(10) Patent No.: US 8,701,764 B2
(45) Date of Patent: Apr. 22, 2014

(54) OIL SAND PRODUCTION WITHOUT CO2 EMISSION

(75) Inventors: Knut Børseth, Sandefjord (NO); Tor Christensen, Sandefjord (NO); Henrik Fleischer, Slependen (NO)

(73) Assignee: Sargas AS, Oslo (NO)

( * ) Notice: Subject to any disclaimer, the term of this patent is extended or adjusted under 35 U.S.C. 154(b) by 952 days.

(21) Appl. No.: 12/833,570

(22) Filed: Jul. 9, 2010

(65) Prior Publication Data

US 2011/0005750 A1    Jan. 13, 2011

(30) Foreign Application Priority Data

Jul. 11, 2009 (NO) .................................. 20092625

(51) Int. Cl.
    *E21B 43/24*    (2006.01)

(52) U.S. Cl.
    USPC ................ 166/272.3; 122/31.1; 122/20 R (58) Field of Classification Search
    USPC .......... 166/272.3; 122/31.1, 483, 20 R, 20 A, 122/20 B, 37
    See application file for complete search history.

(56) References Cited

U.S. PATENT DOCUMENTS

| | | | |
|---|---|---|---|
| 3,047,479 A * | 7/1962 | Young et al. .................. | 376/366 |
| 6,596,142 B2 | 7/2003 | McGee | |
| 6,840,199 B2 * | 1/2005 | Van Dongen et al. ...... | 122/20 B |
| 6,983,723 B2 * | 1/2006 | Brewster et al. ............. | 122/15.1 |
| 7,243,618 B2 * | 7/2007 | Gurevich ...................... | 122/7 R |
| 7,278,379 B2 * | 10/2007 | Peckham et al. ................ | 122/40 |
| 7,328,581 B2 * | 2/2008 | Christensen et al. ........... | 60/783 |
| 7,632,394 B2 * | 12/2009 | Dighe et al. .................... | 208/75 |
| 7,785,550 B2 * | 8/2010 | Hofmann et al. ............. | 423/219 |
| 7,931,888 B2 * | 4/2011 | Drnevich et al. ............. | 423/650 |
| 7,947,114 B2 * | 5/2011 | Hagg et al. ........................ | 95/51 |
| 2003/0127226 A1 | 7/2003 | Heins | |
| 2003/0129108 A1 * | 7/2003 | Burch et al. .................. | 422/188 |
| 2006/0065213 A1 * | 3/2006 | Sarkar ......................... | 122/406.1 |
| 2008/0236117 A1 | 10/2008 | Zhang et al. | |
| 2009/0206007 A1 * | 8/2009 | Allam ........................... | 208/415 |

FOREIGN PATENT DOCUMENTS

| | | |
|---|---|---|
| WO | WO 2004/001301 A2 | 12/2003 |
| WO | WO 2007/050445 A1 | 5/2007 |

\* cited by examiner

*Primary Examiner* — Steven B McAllister
*Assistant Examiner* — Ko-Wei Lin
(74) *Attorney, Agent, or Firm* — Birch, Stewart, Kolasch & Birch, LLP (57) ABSTRACT

A plant for generation of steam for oil sand recovery from carbonaceous fuel with capture of $CO_2$ from the exhaust gas, comprising heat coils (105, 105', 105") arranged in a combustion chamber (101) to cool the combustion gases in the combustion chamber to produce steam and superheated steam in the heat coils, steam withdrawal lines (133, 136, 145) for withdrawing steam from the heat coils, an exhaust gas line (106) for withdrawal of exhaust gas from the combustion chamber (101), where the combustion chamber operates at a pressure of 5 to 15 bara, and one or more heat exchanger(s) (107, 108) are provided for cooling of the combustion gas in line (106), a contact device (113) where the cooled combustion gas is brought in countercurrent flow with a lean $CO_2$ absorbent to give a rich absorbent and a $CO_2$ depleted flue gas, withdrawal lines (114, 115) for withdrawal of rich absorbent and $CO_2$ depleted flue gas, respectively, from the contact device, the line (115) for withdrawal of $CO_2$ depleted flue gas being connected to the heat exchangers (107, 108) for heating of the $CO_2$ depleted flue gas, and where the rich absorbent is regenerated an absorbent regenerator (116), the regenerated lean absorbent is recycled to the absorber (113), and a gas withdrawal line (121) connected to the absorber for withdrawal of $CO_2$ and steam from the regenerator (116), is described.

12 Claims, 6 Drawing Sheets

OIL SAND PRODUCTION WITHOUT CO2 EMISSION

TECHNICAL FIELD

The present invention relates to a method and a plant for oil sand recovery, heavy oil upgrading and power production with significantly reduced $CO_2$ emission compared to the solutions according to the state of the art.

BACKGROUND

The global oil demand is increasing at the same time as easily recoverable oil resources become are recovered. Oil sand is a resource that has been exploited for some time but exploitation of this resource has negative environmental aspects in addition to be relatively expensive.

Oil sands, also known as tar sands or extra heavy oil, are a kind of bitumen deposit that is found in a mixture of sand and/or clay, and water. Recovering, processing and upgrading of the mixture to obtain commercial oil are energy demanding and result in high $CO_2$ emission. This has caused environmental concerns related to this exploitation.

Oil sand is recovered either by opencast mining, or by drilling into an oil and field and withdrawing the bitumen from the sub terrain structure. The choice of method depends on several factors, such as the actual structure and availability of the field. Recovering of bitumen from oil sand in a sub terrain structure by drilling into the structure and recovering the bitumen through oil wells, normally requires heating of the structure as the viscosity of the bitumen at the temperatures in the structures requires measures for lowering the viscosity such as heating or solvent extraction.

Known methods for heating of an oil sand reservoir are:

Toe to heel air injection, where air is injected into an injection well, the bitumen is ignited to create a vertical wall of fire driving the lighter components of the bitumen towards a production well.

Cyclic steam stimulation, wherein steam at 300 to 340° C. is injected into a well, or a plurality of wells, for å period of weeks to months to elevate the temperature in the structure. After allowing the well to sit for some days to weeks, oil is produced. When the production falls below a set limit, the steam injection is started again.

Steam assisted gravity drainage, wherein groups of horizontal wells are drilled in the oil sands, a first group is drilled at the bottom of the formation and the second group about 5 meter above the first. Steam is injected into the second group of wells, melting the bitumen that flows to the first group of wells and pumped to the surface.

Electro thermal stimulation (see e.g. U.S. Pat. No. 6,596, 142), wherein a plurality of electrodes is inserted into the reservoir and the reservoir is heated electrically and heat is transferred within the reservoir by means of convection and conduction. The melted bitumen is then allowed to flow into production wells and is pumped to the surface. Preferably, water is injected simultaneously with the heating to further increase the production from the well.

Additionally, a method combining injection of steam with electrical heating of a reservoir is known from WO2007050445.

The toe to heel method is hard to control and is not suitable for all formations. Additionally, the combustion produces and emits $CO_2$ to the surroundings.

The methods for heating the formation are all energy consuming methods, where natural gas, oil and/or coal are combusted to produce steam and/or electrical power, an activity that causes $CO_2$ emission from the production of oil at an unacceptable high level. In many jurisdictions import of oil produced from oil sands is prohibited of this reason and it expected that laws and regulations in this regard will be introduced in many countries around the world due to the effect of $CO_2$ on the greenhouse effect.

SUMMARY OF THE INVENTION

According to a first aspect, the present invention relates to a plant for generation of steam for oil sand recovery from carbonaceous fuel with capture of $CO_2$ from the exhaust gas, the plant comprising fuel line(s) for introduction of the fuel into a combustion chamber, air lines for introduction of air or another oxygen containing gas into the combustion chamber, heat coils arranged in the combustion chamber (101) to cool the combustion gases in the combustion chamber to produce steam and superheated steam in the heat coils, steam withdrawal lines for withdrawing steam from the heat coils, an exhaust gas line for withdrawal of exhaust gas from the combustion chamber, wherein the plant additionally comprises one or more compressors (to compress the air or oxygen containing gas to be introduced into the combustion chamber operating at a pressure of 5 to 15 bara, one or more heat exchanger(s) for cooling of the combustion gas in line, a contact device where the cooled combustion gas is brought in countercurrent flow with a lean $CO_2$ absorbent to give a rich absorbent and a $CO_2$ depleted flue gas, withdrawal lines for withdrawal of rich absorbent and $CO_2$ depleted flue gas, respectively, from the contact device, the line for withdrawal of $CO_2$ depleted flue gas being connected to the heat exchangers (107, 108) for heating of the $CO_2$ depleted flue gas, one or more turbine(s) for expanding the $CO_2$ depleted flue gas after heating, a flue gas line for releasing the expanded and $CO_2$ depleted flue gas into the surroundings, an absorbent regenerator wherein the rich absorbent is regenerated, a lean absorbent line for recycling of regenerated absorbent to the absorber (113), and a gas withdrawal line connected to the absorber for withdrawal of $CO_2$ and steam from the regenerator, and a steam line for introduction of stream into an oil sands reservoir.

According to a first embodiment, one or more heat exchanger(s) is (are) arranged on steam lines, where a water line is arranged to introduce water into the heat exchanger, and the steam line is arranged to withdraw steam from the heat exchanger.

According to a second embodiment, one or more steam turbines is (are) arranged or expanding steam from lines to generate electrical power.

According to a third embodiment, the plant additionally comprises a heavy oil upgrade facility for upgrading the produced heavy oil from the oil sands.

According to a fourth embodiment, the plant additionally comprises a gasifier for gasification of coal, a char line for withdrawing produced char, a gas withdrawal line for withdrawal of produced gas in the gasifier, the gas withdrawal line being connected to a separator for separation of the gasified products, a heavy hydrocarbons line for withdrawal of a heavy hydrocarbon fraction of the gasified products, a gas line for withdrawal of a gas mainly comprising methane and CO, and a hydrogen line for withdrawing hydrogen from the separator and introducing the hydrogen into the upgrade facility.

According to a fifth embodiment, the plant additionally comprises a char and gas fired power plant for producing heat and electrical power, the plant comprising an exhaust gas line for withdrawal of exhaust gas from the power plant and for introducing the exhaust gas as an oxygen containing gas into a power plant with $CO_2$ abatement.

According a sixth embodiment, wherein the exhaust gas line is connected to an additional gas fired, power plant with $CO_2$ capture for introduction of the exhaust gas as an oxygen containing gas into the power plant.

According to a second aspect, the present invention relates to a system for producing oil from an oil sands field, where vapor injection wells, production wells and electrodes are provided in the oil gas field, wherein the system includes a plant as described above.

DETAILED DESCRIPTION OF THE INVENTION

Figure 1:
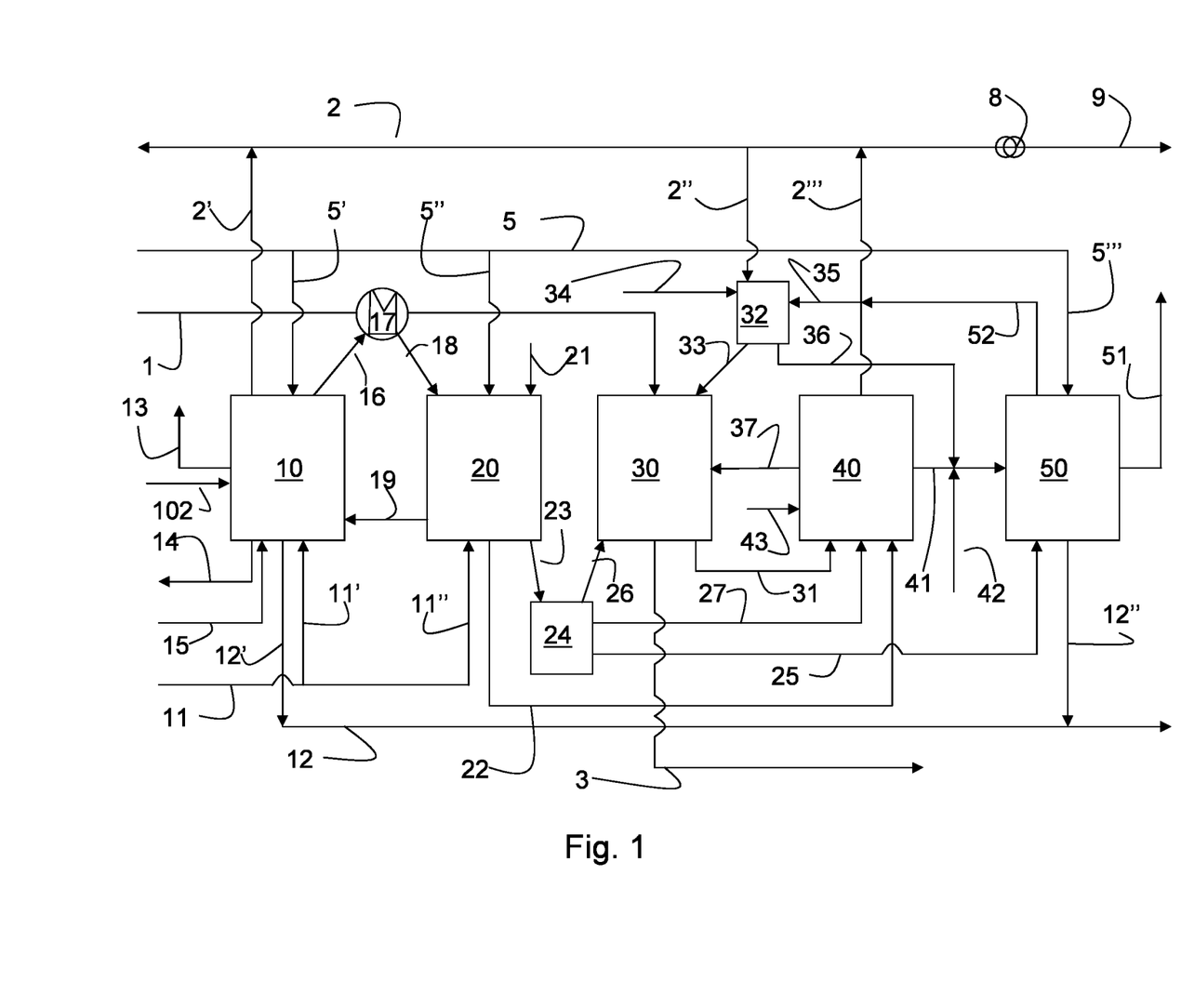
FIG. 1 is an exemplary flow diagram for a plant according to the invention.

FIG. 1 is an illustration of a plant according to the present invention.

Figure 2:
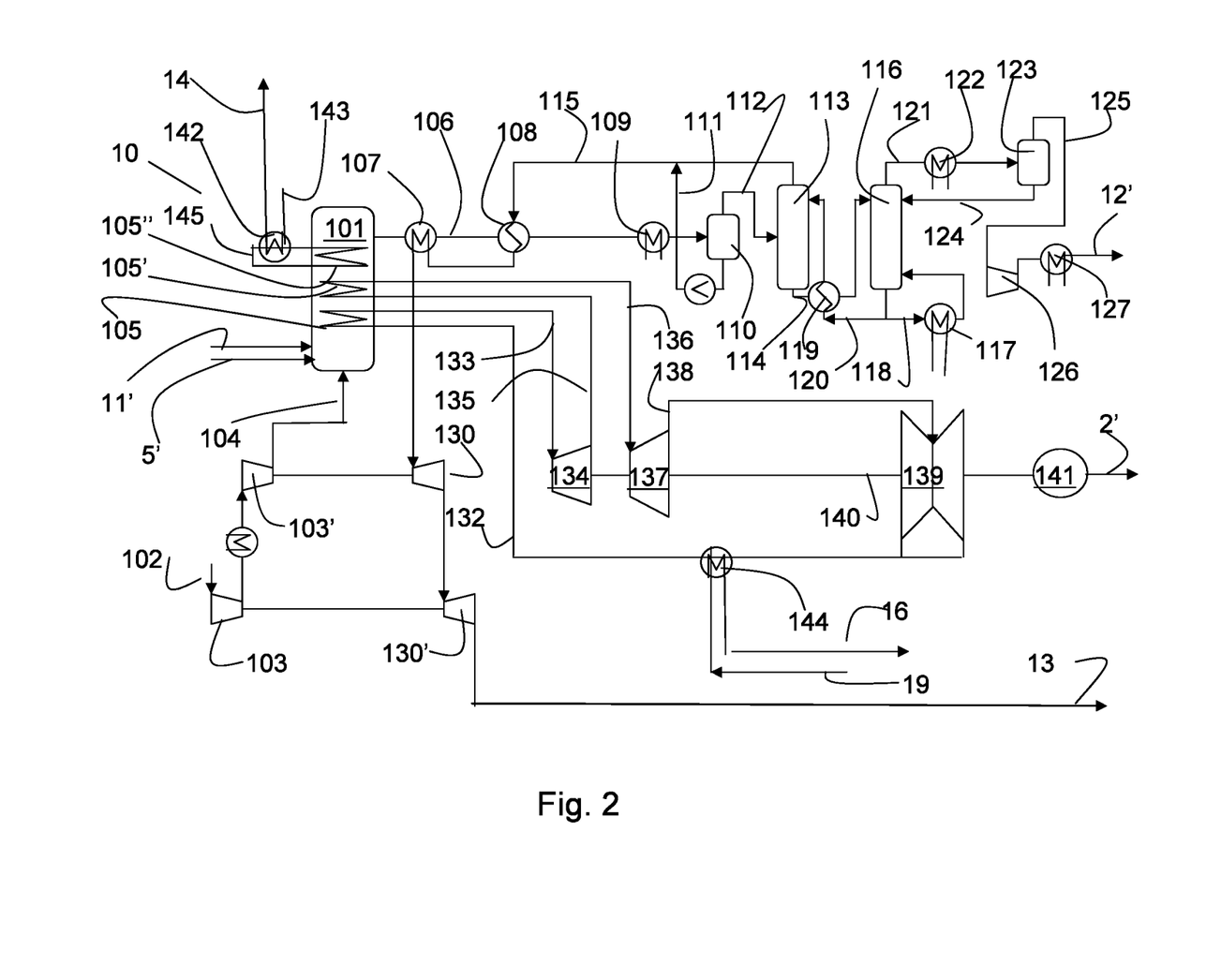
FIG. 2 is a flow diagram illustrating a power plant part of a plant according to FIG. 1.

A power plant 10, preferably a plant with $CO_2$ abatement substantially according to WO2004001301 to Sargas A S, is provided for production of electricity, steam and to provide heat for heat consuming processes. FIG. 2 is a simplified view of the power plant of this type.

The power plant 10 may be fired by any suitable carbonaceous fuel, such as coal, natural gas or oil, or any combination thereof dependent on the local price and availability thereof. Coal is introduced into the power plant 10 through a coal line 11, 11'. The coal is grinded and mixed with water and optionally with oil sand that is introduced through an oil sand line 15, into a slurry that is pumped into a pressurized combustion chamber 101 and combusted, preferably in a pressurized fluidized bed together with air. The air is introduced through an air intake 102 and is compressed by means of one or more compressor(s) 103, 103' before it is introduced into the combustion chamber through an air line 104. The coal may be substituted or supplemented by natural gas introduced trough line 5, 5'.

The temperature in the combustion chamber reduced by means of production of steam and superheating of steam in tube bundles 105, 105', 105" respectively, that are arranged in the combustion chamber 101.

Combustion gas from the combustion chamber 101 is withdrawn through an exhaust gas line 106 and is cooled in heat exchangers 107, 108 and optionally by one or more coolers 109. Condensed water in the cooled combustion gas is removed in a flash tank 110 and withdrawn through a water line 111.

The cooled exhaust gas leaving the flash tank 110 is withdrawn trough a line 112 from which it is introduced into an absorber 113 and is caused to flow countercurrent to a liquid $CO_2$ absorbent, to give a rich $CO_2$ absorbent that is loaded with $CO_2$ that is withdrawn through an absorber exit line 114, and a $CO_2$ depleted exhaust gas that is withdrawn through a flue gas line 115.

The rich absorbent in line 114 is introduced into a regenerator column 116 where it is caused to flow countercurrent with steam generated in a reboiler 117 by boiling a part of the lean, or low $CO_2$ absorbent, that is withdrawn from the bottom of the regenerator in a lean absorbent withdrawal line 118. Lean absorbent is withdrawn from the bottom of the regeneration column in a line 120 and is recycled to the absorber 113. A heat exchanger 119 is preferably provided to cool the lean absorbent in line 120 against rich absorbent in line 114 before the rich absorbent is introduced into the regeneration column.

Released $CO_2$ and water vapor are withdrawn from the regeneration column through a gas withdrawal line 121. The gas in the gas withdrawal line 121 is cooled by a cooler 122 and gas and water is separated in a separation tank 123, where water is collected in the bottom of the tank and withdrawn through a line 124 to be reintroduced into the process, e.g. as indicated in the figure by introduction of the water in the regeneration column to maintain the water balance in the system. The gas phase in the separation tank 123, being partly dried $CO_2$, is withdrawn through a gas line 125 and is further treated, mainly by compression and cooling as indicated with compressor 126 and cooler 127. Cooled and compressed $CO_2$ is exported from the power plant 10 through a $CO_2$ line 12', 12 to be exported from the plant for deposition or enhanced oil recovery (EOR).

Water from line 111 is preferably inserted into the $CO_2$ depleted flue gas withdrawn through line 115, and the gas is reheated in heat exchangers 108, 107 against the incoming exhaust gas in line 106. The reheated $CO_2$ depleted flue gas is expanded over one or more turbines 130, 139' before the expanded gas is released into the surroundings through a outlet line 131. The turbine(s) 130, 130' may be arranged to operate the compressors 130, 130' and may additionally, or alternatively, be connected to a generator for production of electrical power.

Water is introduced through a water injection line into tube bundle 105 in the combustion chamber 101 to produce steam that is withdrawn through a steam line 133 and is expanded over a turbine 134. The expanded steam from turbine 134 is withdrawn through a line 135 and is introduced into the tube bundle 105 where the steam in line 135 is heated to produce superheated steam that is withdrawn through superheated steam line 136 and introduced into and expanded in a turbine 137.

Expanded steam from the turbine 137 is withdrawn through a steam line 138 and is introduced into a low pressure turbine 139 and expanded therein. The turbines 134, 137 and 139 may be arranged on a common shaft 140 to produce electrical power in a generator 141 arranged at the same shaft. The electrical power produced in generator 141 and any other electrical power generated in the power plant 10, is exported from the power plant 10 through line 2, 2' as will be described below.

Tube bundle 105" is connected to a steam cycle 145 into which steam is withdrawn and introduced into a heat exchanger 142. Water is introduced into heat exchanger 142 through a water inlet line 143. The introduced water Is vaporized in heat exchanger 142 against the steam in the steam cycle 145, and the produced steam in the heat exchanger 142 is withdrawn through steam line 14, as described with reference to FIG. 1. The cooled steam/condensed water in steam cycle 145 is then reintroduced into the tube bundle 105". It would be possible to introduce water from line 143 directly into the tube bundle 105" to avoid the steam cycle 145 and the heat exchanger 142 and connect line 14 directly to the tube bundle 105". The requirements for purity of the water to be introduced into a tube bundle in a boiler are, however, strong to avoid depositions and corrosion in the tubes. An indirect heating system comprising a closed cycle of water/steam connected to a heat exchanger is therefore preferred.

Depending on the relative requirement for electrical power and steam for EOR, the tube coils 105, 105' and 105" may be dimensioned or operated to meet different needs. In a first embodiment illustrated in FIG. 2, steam and superheated steam are produced in tube coils 105, 105', respectively, which steam is expanded over steam turbines 134, 137, 139 for generation of power as described above. Steam EOR is generated as described above by steam generation in the tube coil 105" for heating of water and generation of steam in the heat exchanger 142. Steam for EOR is withdrawn through line 14.

Figure 3:
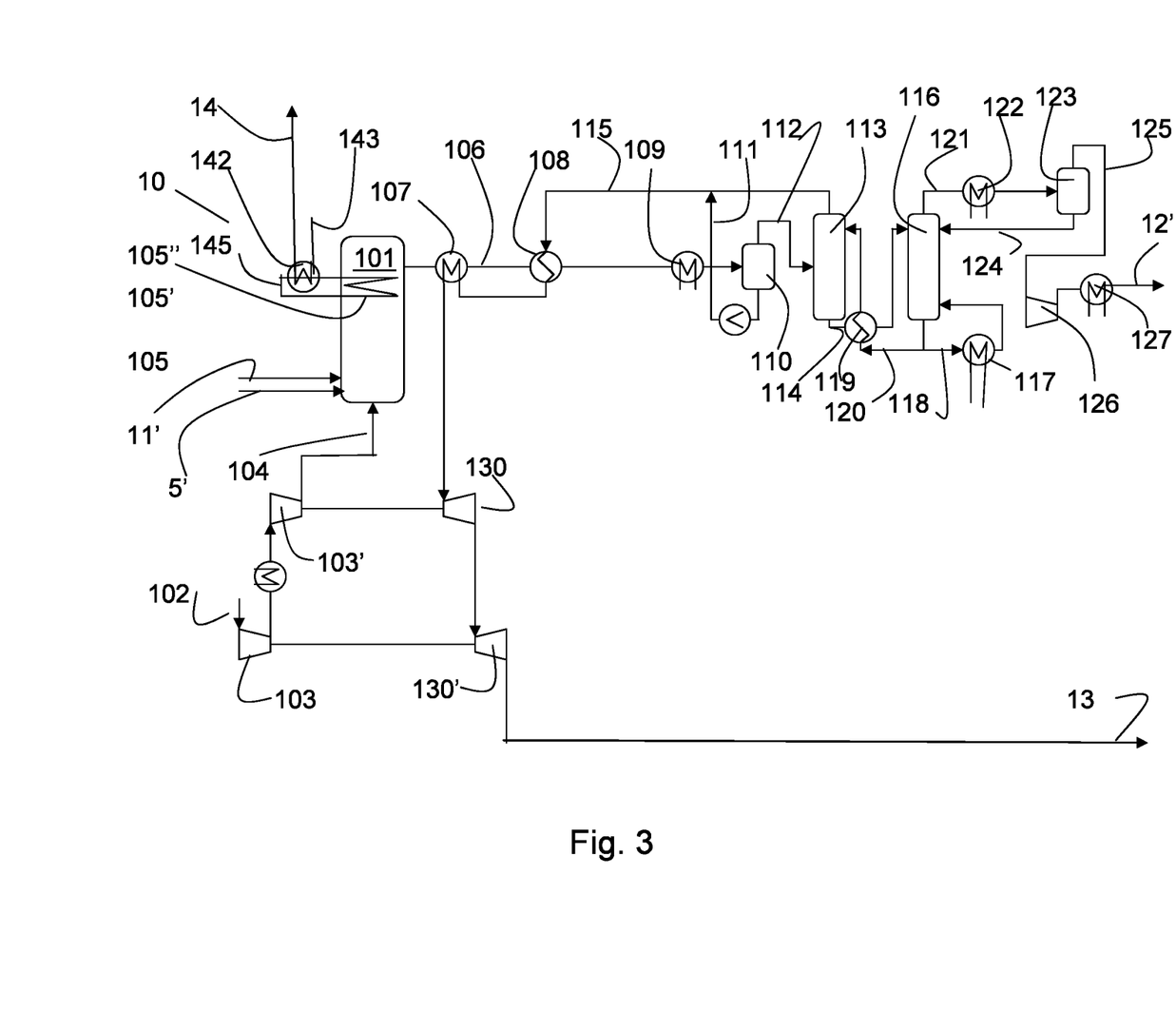
FIG. 3 is an illustration of an alternative embodiment of the power plant part as illustrated in FIG. 2.

In a second embodiment, illustrated in FIG. 3, tube bundles 105, 105' are omitted and substituted totally by tube bundle 105" so that all steam production in the boiler is produced in tube coils 105" and is used for EOR.

Figure 4:
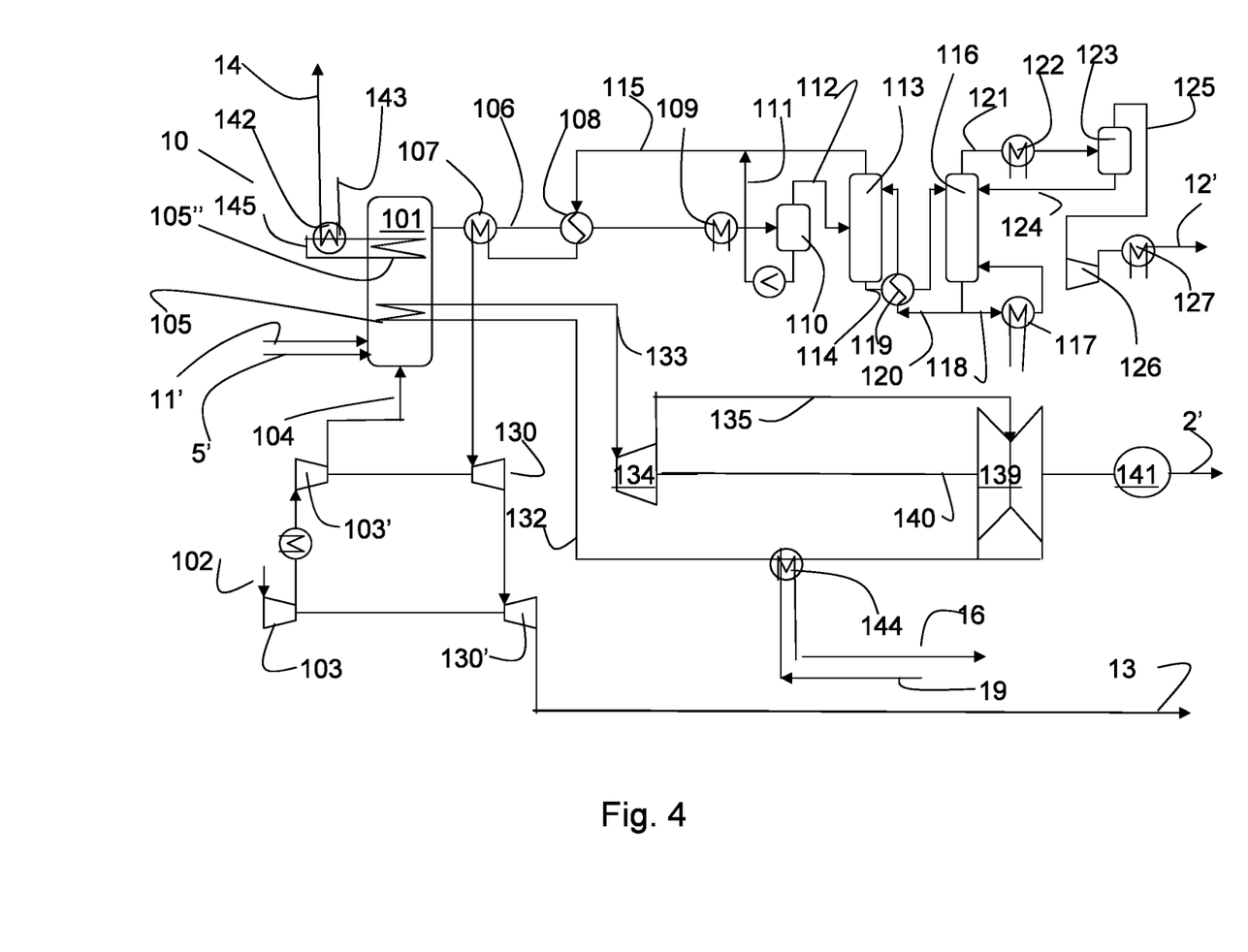
FIG. 4 is a second alternative embodiment of the power plant part as illustrated in FIG. 2.

FIG. 4 illustrates a third embodiment, wherein tube coil 105' is omitted. Both tube coils 105 and 105" may be dimensioned individually to cool the combustion gases in the combustion chamber to the required temperature, so that the plant may be operated in different modes, a normal mode where both electrical power and steam for EOR are produced, and alternative modes where all steam generated in the tube coils are produced in either tube coils 105 or 105", to result in production of electrical power only or steam for EOR only.

Any electrical power generated by the power plant 10 is withdrawn through lines 2', 2 to be used in the plant 1 or to be exported. The electrical power in line 2 may be used as a supplement of alternative to steam injection to promote production of bitumen, by means of electrodes inserted into the oil sand field.

Low temperature heat from the power plant, e.g. from any of the coolers such as a cooler 144 provided in line 132, may be withdrawn through a line 16 and be used in a heat exchanger 17 for heating the incoming bitumen in line 1 to reduce the viscosity thereof. The skilled man in the art will, however, understand that heat from several coolers may be combined in line 16. Water return from the heat exchanger is withdrawn in a line 18 back to the power plant 10, e.g. via a gasifier 20, where the remaining heat in the water may be used to preheat incoming coal to be gasified, before the water is returned to the power plant 10 via a line 19.

The gasifier 20 is provided to gasify coal. Coal is introduced into the gasifier 20 through the coal line 11, 11" and as mentioned above, the incoming coal may be preheated by means of steam or water return from heat exchangers. Gas is introduced into the gasifier to heat the coal in a gasifying reactor to a temperature typically above 700° C. Different processes may occur in the gasifier:

Pyrolysis (or devolatization), that occurs as a result of the heating of coal particles. During pyrolysis volatiles in form of heavy hydrocarbons (HC), hydrogen and lighter hydrocarbons, mostly methane, are released to leave char as a solid. The volatiles may constitute up to 70% of the coal weight.

Gasification by reaction with water to produce hydrogen and carbon monoxide according to the reaction $C+H_2O \rightarrow H_2+CO$.

Water shift reaction, being a reversible reaction that may increase the hydrogen production according to the following reaction $CO+H_2O \leftarrow \rightarrow CO_2+H_2$.

Additionally, partial combustion by addition of a controlled amount of oxygen may be included to provide heat for the gasification process.

Water may be introduced into the gasifier 20 through a water line 21 to increase the production of hydrogen in the gasifier if required or preferred.

Char from the gasifier is withdrawn trough a char line 22. The volatiles are removed through a volatile line 23 and are introduced into a separator 24. In the separator 24 heavy hydrocarbons (HC) are separated from the remaining volatiles by condensation and are withdrawn trough a HC line 25. Hydrogen is separated from the remaining gaseous phase in the separator 24 by means of any convenient separation technology, such as membranes or pressure swing separation. Hydrogen is withdrawn through a hydrogen line 26, and delivered to the upgrade facility 30, whereas the remaining gaseous phase, mainly comprising methane and CO, is withdrawn through a gas line 27.

The steam in the above mentioned line 14 is introduced into a not shown oil sand reservoir to produce bitumen from the reservoir. The produced bitumen is withdrawn from the reservoir through the bitumen line 1, and optionally heated in the heat exchanger 17 before the bitumen is introduced into an upgrade facility 30.

In the upgrade facility, the bitumen is treated in a conventional way by removal of water, sand, physical waste and lighter products, catalytic purification for removal of metals, nitrogen and sulfur, and cracking, or cutting, of long hydrocarbon chains to produce shorter hydrocarbon chains to reduce the viscosity of the resulting mixture of hydrocarbons substantially.

Metals, sulfur and nitrogen that are bound to hydrocarbons in the bitumen are removed by hydrogenation processes. Removal of sulfur and nitrogen is typically performed in a reactor in the presence of a metal catalyst at an elevated temperature, such as e.g. 300 to 400° C. and at an elevated pressure, such as from 30 to 130 bara, to produce a desulfurized and/or denitrogenified hydrocarbon product and $H_2S$ and/or $NH_3$ that are separated from the product.

Heavy hydrocarbons are cracked, or cut in shorter hydrocarbon chains, by hydrocracking that is a catalytic cracking process at an elevated pressure of hydrogen, to give lighter, and substantially saturated hydrocarbons that are suitable for the demand for gasoline, diesel, kerosene etc.

Hydrogen for the upgrading facility is added to the upgrade facility through the hydrogen line 26. An additional hydrogen line 33 receiving hydrogen from an electrolytic unit 32, may be provided if additional hydrogen is needed. The electrolytic unit 32 splits water introduced through a water line 34 electrolytic by means of electrical power received through a power line 2" receiving power from the line 2. Hydrogen is withdrawn through line 33 and is introduced into the upgrade facility, whereas oxygen is withdrawn through an oxygen line 36.

Heat for the upgrading of the bitumen is received through, preferably in the form of steam, in a line 37. The steam in line 37 is generated in a power plant 40 fired primarily by higher hydrocarbons leaving the upgrade facility in line 31, coke generated in the gasifier 20 and that is carried in line 22 from the gasifier to the power plant 40, and higher hydrocarbons in line 27 that are separated from the volatiles in the separator 24.

The oil resulting from the upgrading of bitumen is withdrawn from the plant through a product line 3 for export from the plant.

The power plant 40 is thermal power plant that can combust coke, and higher hydrocarbons to produce steam that is withdrawn through line 37, and electrical power that is withdrawn through line 2''' and delivered to line 2 of use in the plant or to be exported. Air is introduced into the power plant 40 through an air line 43.

Exhaust gas from the power plant 40 is withdrawn through en exhaust line 41 and is mixed with air in an air line 42, and optionally with oxygen from line 36, before being introduced into a power plant 50 with $CO_2$ abatement as oxygen containing gas. The power plant 50 is preferably a plant substantially as described with reference to FIG. 2. The fuel into the power plant 50 is mainly methane and CO from the separator 24 through line 25 and natural introduced through line 5''', both into the combustion chamber 101. $CO_2$ is withdrawn through line 12'' and is combined with the $CO_2$ in line 12 for deposition or EOR. $CO_2$ depleted and expanded flue gas, is released into the surroundings through a flue gas line 51, whereas electrical power is withdrawn through line 52 and combined with the electrical power in line 2''', 2.

Electrical power in line 2 is used for different purposes in the plant, for promoting production of bitumen and surplus electrical power may be delivered to the grid 9 via a transformer 8.

Figure 5:
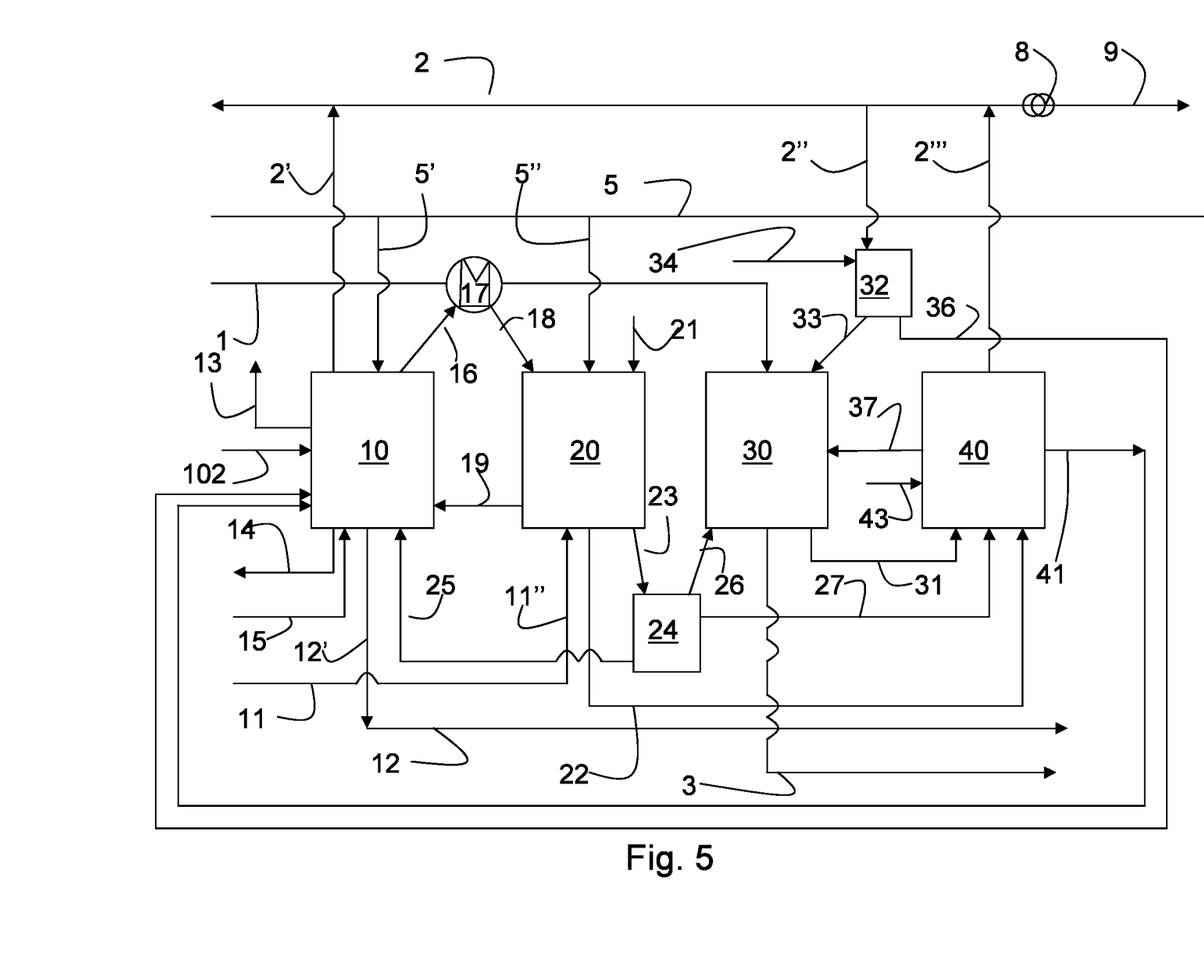
FIG. 5 is a flow diagram of an alternative embodiment of the plant according to the present invention.

FIG. 5 illustrates an alternative embodiment of the present invention where power plants 10 and 50 are combined in one power plant 10. Exhaust line 41 from the power plant 40, and oxygen line 36 are here arranged to deliver the exhaust gas from the power plant 40 and oxygen from the electrolysis unit 32, respectively, to the power plant 10 to be combined with air introduced through air intake 102, as oxygen containing gas for the combustion in the combustion chamber 101. In this embodiment, natural gas constitutes all or most of the fuel for the power plant 10. Additionally, power plant 10 must be dimensioned to handle the capacity of both power plant 10 and 50.

Figure 6:
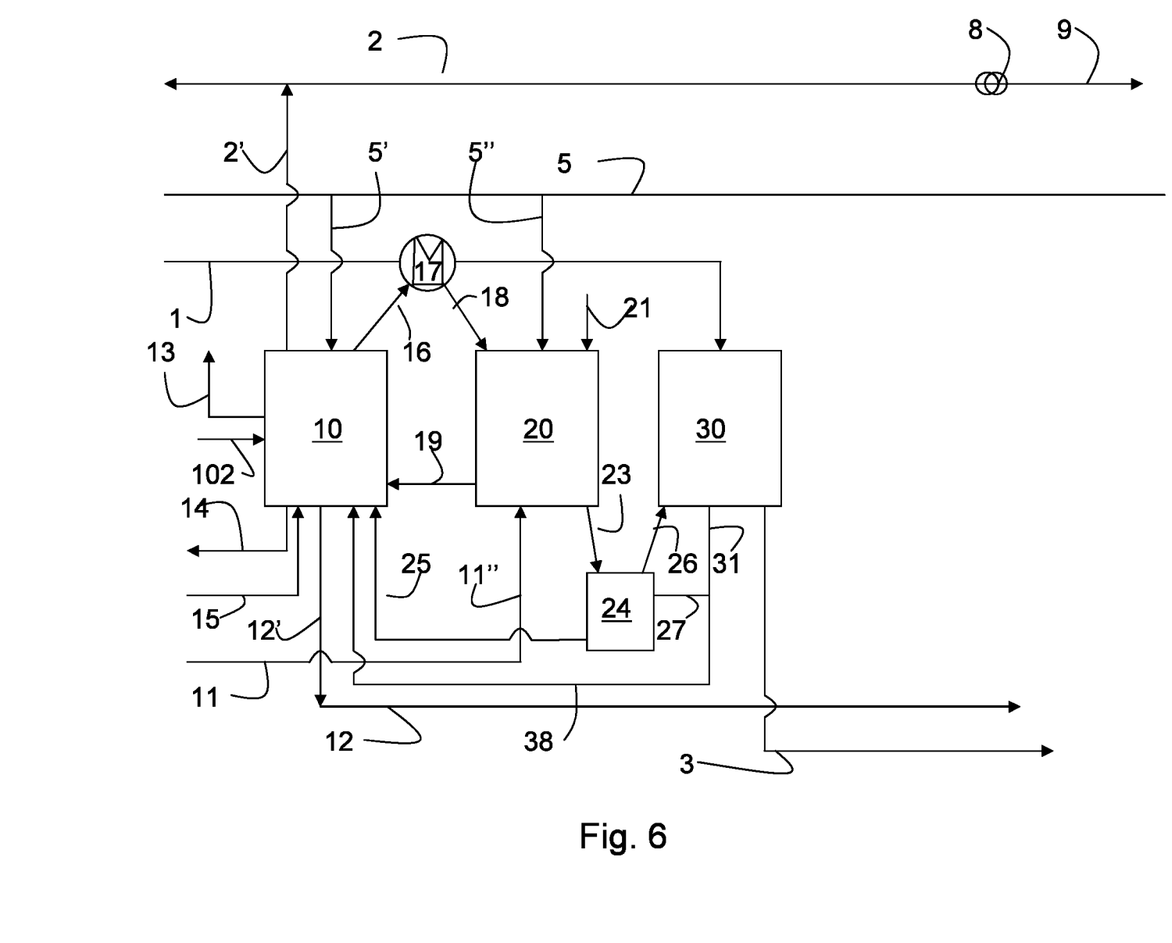
FIG. 6 is a second alternative embodiment of the plant according to the present invention.

FIG. 6 illustrates yet an alternative embodiment of the present plant including one power plant 10 with $CO_2$ capture, a gasifier 20 and an upgrade facility 20. In this embodiment the gasifier is operated so that the carbon in coal is gasified by the formula $C+H_2O \rightarrow CO+H_2$. The generated hydrogen may again react with additional water according to the above mentioned water gas shift reaction to give $CO_2$ and additional hydrogen. The energy need of the reactions in the gasifier may be solved by introduction of some oxygen containing gas, resulting in a partial oxidation of carbon in an exothermal reaction.

When the gasifier is operated to give only gaseous products there is no need for a char fired power plant. Any heat demand in any part of the plant may be solved by heat integration i.e. transferring heat from a location where cooling is needed to heat a heat demanding part of the plant, or to take a part of the steam in line 14 and introduce this steam into a heat demanding process.

Hydrogen from the separation unit 24 is introduced into the upgrade facility as described above, and the remaining gas from the separation unit is withdrawn though lines 27, 25, respectively, and introduced into power plant 10 as fuel gas, together with heavy hydrocarbons withdrawn from the upgrade facility through line 31.

The invention claimed is:

1. A plant for generation of steam for oil sand recovery from carbonaceous fuel with capture of $CO_2$ from the exhaust gas, the plant comprising:

at least one fuel line for introduction of the fuel into a combustion chamber;

at least one air line for introduction of air or another oxygen containing gas into the combustion chamber;

at least one heat coil arranged in the combustion chamber to cool the combustion gases in the combustion chamber to produce steam and superheated steam in the heat coils; steam withdrawal lines for withdrawing steam from the heat coils;

an exhaust gas line for withdrawal of exhaust gas from the combustion chamber;

one or more compressors to compress the air or oxygen containing gas to be introduced into the combustion chamber operating at a pressure of 5 to 15 bara;

one or more heat exchangers for cooling of the combustion gas in the exhaust gas line;

a contact device where the cooled combustion gas is brought in countercurrent flow with a lean $CO_2$ absorbent to give a rich absorbent and a $CO_2$ depleted flue gas;

withdrawal lines for withdrawal of rich absorbent and $CO_2$ depleted flue gas, respectively, from the contact device, the line for withdrawal of $CO_2$ depleted flue gas being connected to the heat exchangers for heating of the $CO_2$ depleted flue gas;

one or more turbines for expanding the $CO_2$ depleted flue gas after heating;

a flue gas line for releasing the expanded and $CO_2$ depleted flue gas into the surroundings;

an absorbent regenerator wherein the rich absorbent is regenerated;

a lean absorbent line for recycling of regenerated absorbent to the absorber;

a gas withdrawal line connected to the absorber for withdrawal of $CO_2$ and steam from the regenerator; and a steam line for introduction of steam into an oil sands reservoir;

a heavy oil upgrade facility for upgrading the produced heavy oil from the oil sands; a gasifier for gasification of coal; a char line for withdrawing produced char; a gas withdrawal line for withdrawal of produced gas in the gasifier, the gas withdrawal line being connected to a separator for separation of the gasified products; a heavy hydrocarbons line for withdrawal of a heavy hydrocarbon fraction of the gasified products; a gas line for withdrawal of a gas mainly comprising methane and CO; and a hydrogen line for withdrawing hydrogen from the separator and introducing the hydrogen into the upgrade facility.

2. The plant according to claim 1, wherein one or more heat exchangers are arranged on the steam withdrawal lines, where a water line is arranged to introduce water into the one or more heat exchangers arranged on the steam withdrawal lines, and the steam line for introduction of steam into an oil sands reservoir is arranged to withdraw steam from the one or more heat exchangers arranged on the steam withdrawal lines.

3. The plant according to claim 1, wherein one or more steam turbines are arranged for expanding steam from the steam withdrawal lines to generate electrical power.

4. The plant according to claim 1, further comprising:
a char and gas fired power plant for producing heat and electrical power; and
an exhaust gas line for withdrawal of exhaust gas from the power plant and for introducing the exhaust gas as an oxygen containing gas into a power plant with $CO_2$ abatement.

5. The plant according to claim 4, wherein the exhaust gas line is connected to an additional gas fired, power plant with $CO_2$ capture for introduction of the exhaust gas as an oxygen containing gas into the power plant.

6. A system for producing oil from an oil sands field, where vapor injection wells, production wells and electrodes are provided in the oil gas field, wherein the system comprises a plant according to claim 1.

7. The plant according to claim 2, wherein one or more steam turbines are arranged for expanding steam from the steam withdrawal lines to generate electrical power.

8. The plant according to claim 2, further comprising a heavy oil upgrade facility for upgrading the produced heavy oil from the oil sands.

9. The plant according to claim 3, further comprising a heavy oil upgrade facility for upgrading the produced heavy oil from the oil sands.

10. The plant according to claim 9, further comprising:
a gasifier for gasification of coal;
a char line for withdrawing produced char;
a gas withdrawal line for withdrawal of produced gas in the gasifier, the gas withdrawal line being connected to a separator for separation of the gasified products;
a heavy hydrocarbons line for withdrawal of a heavy hydrocarbon fraction of the gasified products;
a gas line for withdrawal of a gas mainly comprising methane and CO; and
a hydrogen line for withdrawing hydrogen from the separator and introducing the hydrogen into the upgrade facility.

11. The plant according to claim 10, further comprising:
a char and gas fired power plant for producing heat and electrical power; and
an exhaust gas line for withdrawal of exhaust gas from the power plant and for introducing the exhaust gas as an oxygen containing gas into a power plant with $CO_2$ abatement.

12. The plant according to claim 11, wherein the exhaust gas line is connected to an additional gas fired, power plant with $CO_2$ capture for introduction of the exhaust gas as an oxygen containing gas into the power plant.

* * * * *